April 4, 1961 H. B. PULLAR 2,977,864
RUBBER COMPOSITION
Filed May 28, 1958
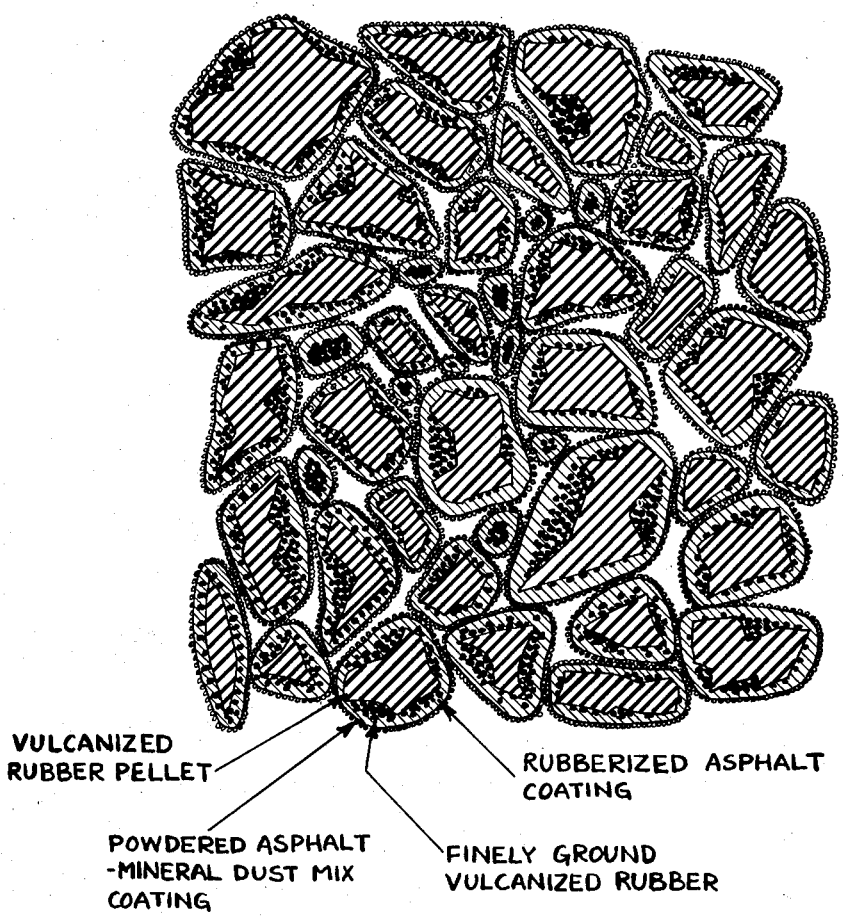
INVENTOR.
HAROLD B. PULLAR
BY Gary, Desmond & Parker
ATTYS.

an about 60% by weight of the entire composition, and thus the major or primary component.

It will be understood that reference to rubber in the foregoing pellets, and subsequent rubber components to be described herein, and as employed in the following claims, is intended to include natural rubber and synthetic rubbers having similar physical properties of which the rubbery copolymers of butadiene with styrene or acrylonitrile, polybutadiene, polyisoprene, and their mixtures, are representative examples.

The second characterizing component in the production of the composition of the present invention is the use of relatively fine, ground particles of vulcanized rubber, all of which pass a 20 mesh size screen, and preferably an 80 mesh screen, with a good percentage even passing a 200 mesh screen. That is, with this component the finer the particle size the better. These likewise should be free of fiber and may be derived from the same source as the larger pellets. More practically, they result from commercial grinding processes such as in the recapping of tires. They are employed in the present composition in the proportions of from about 15% to about 25% by weight, and act as a rubber densifying medium for the over-all composition, i.e., for filling the voids in subsequent aggregation of the previously described pellets.

The third characterizing component of the present invention, which is used in the proportions of from about 20% to about 30% by weight, is rubberized asphalt, a composite of asphaltic material and unvulcanized rubber solids derived from a latex, the composite containing from about 1% to about 5% by weight of latex solids, and having a penetration at 77° F. (100 g. 5 sec.), of from about 50 to about 150. This component acts as a cement or binder for the over-all composition, on heating and mixing, as hereinafter described, to provide good affinity for the large and small rubber particles previously described, which would not be the case if asphalt alone were used. Further, as employed herein, a rubberized asphalt having, for example, an 85–100 penetration at 77° F., has a viscosity equivalent to a 30–40 penetration conventional asphalt.

The rubberized asphalt employed may be prepared in known manner, such as for example by gradually adding a butadiene-styrene rubbery copolymer latex to a molten body of asphalt of, for example, 100 penetration, with agitation and evaporation of the latex liquids to incorporate 2–3% by weight of rubber solids, with a resulting blend having a penetration of about 90–95. Another method is to first coprepicitate an aqueous slurry of powdered asphalt and latex to form composite particles composed of 90% by weight of asphalt and 10% by weight of rubber latex solids, and subsequently blend the composite particles by heat with a substantially equal amount by weight of a relatively softer asphalt to obtain a proportion of about 5% by weight of rubber and a 50–150 penetration, as desired.

Another method for preparing the rubberized asphalt component is to first combine about 10–15 parts by weight of latex solids, from a latex as aforesaid, with about 85–90 parts by weight of a normally liquid asphaltic oil such as "dispersion oil," a highly aromatic, heavy petroleum oil distillate, by combining a proportioned stream of latex with a proportioned stream of the oil heated to a temperature appreciably above the boiling point of water, to substantially volatilize the water content of the latex and to produce a bituminous material-rubber latex solids blend having a semisolid viscous character when cold. About 15 parts by weight of the foregoing is then mixed, by heating, with about 85 parts by weight of 50–60 penetration asphalt to result in a rubber-asphalt blend of 85-100 penetration having a rubber solids content of about 1.5-2.5% by weight.

The foregoing materials may be combined, in accordance with the present invention, by first separately heating the relatively large rubber pellets in a drum to a temperature in the range of from about 150-250° F. and separately heating the rubberized asphalt to liquefying temperature of from about 300 to about 400° F.

The rubber-asphalt material is heated to a minimum of 300° F. so that it will be a liquid adequate for mixing and distributing over the pellets, and to a maximum of 400° F. so as to prevent deterioration of the rubber, the rubber pellets being preheated as indicated to enhance mixibility and affinity with the rubberized asphalt component.

The heated pellets are then transferred to a pug or any other suitable type of unheated blade mixer, followed by adding the fine ground rubber particles without preheating. After the rubber particle components are suitably mixed the heated rubberized asphalt is transferred into the mixer with continued mixing until the liquefied rubber-asphalt coats the rubber particles. The mix is then discharged and permitted to cool to a maximum of 150-200° F.

While in this form and still tacky condition, the discharged material is dusted with finely divided particle material, all of which passes a 200 mesh screen and the majority of which passes a 350 mesh screen, so that after breaking up aggregates of the particles they all preferably pass a ¼" screen and on cooling will remain in a friable condition and not stick together except under considerable pressure, such as rolling with either a conventional roller or a pneumatic type roller.

In carrying out this dusting step, about 5% by weight thereof of a dusting agent is applied and about 2 to 3% of this is recovered, with about 2 or 3% adhering. This filler material can be in whole or in part composed of barytes, slate flour, limestone dust, or any other relatively inert material.

This dusting composition preferably also contains up to 75% by weight of powdered asphalt, particularly when it is desired to increase the softening point of the mixture, and a preferred dusting composition is one which contains from 25 to 75% by weight of either the asphalt or inert filler, and suitably the composition may be composed of equal parts of the two materials. The powdered asphalt component can be one which has a softening point between 250 and 350° F. and a penetration of between 0 and 5 at 77° F.

The powdered asphalt in the dusting component increases the softening point of the mixture to a desired extent and the filler acts primarily as a separating medium. The dusted composite, while still warm, is then reduced to lumps so that they pass a ¼" screen, after which the material can be stored and packed for use as a commercial product which has long storage stability, since there are no volatiles therein to dry out.

In accordance with a specific example, the following materials were combined in the indicated proportions:

| | Percent by weight |
|---|---|
| Vulcanized rubber pellets, all passing a ¼" screen | 54 |
| Fine ground vulcanized rubber particles, all passing a 20-mesh sieve | 19 |
| Rubberized asphalt of 85-100 penetration grade, containing 2% by weight of rubber | 27 |

The rubber pellets were heated to a temperature of 250° F. and then placed into a pug type mixer to which there was added, while mixing, the fine rubber particles at room temperature to provide an intimate and uniform mixture of the rubber pellets and the fine rubber particles. To this mixture there was then added the rubberized asphalt preheated to a liquid condition at a temperature of about 350° F., and the mixing continued until the rubber particles were thoroughly coated with the liquefied rubberized asphalt, and a uniform mixture produced.

This mixture was then discharged from the pug mixer in a comparatively thin and looselike layer and then dusted with a mixture of equal parts of powdered asphalt and powdered barytes using approximately 5% by weight of this dusting material, approximately one-half of which was subsequently recovered, the remainder becoming adhered to the particle material. This dusting took place while the mixture was at a temperature of about 200° F., and had some surface tack, and until all the rubber mixture had been thoroughly coated and put in a loose, workable condition, producing a finished rubberized product which was reduced to lumps all passing a ¼" screen. This finished product contained about 27% by weight of asphaltic material and about 72% by weight of rubber solids and about 1% by weight of mineral material. This material can then be packed into bags or containers and shipped in a loose, storage stable condition, capable of being subsequently spread and compacted in the cold to produce desirable surfaces of great stability, as aforesaid.

The accompanying drawing is an enlarged diagrammatic sectional view of the product prepared in accordance with the foregoing example and illustrates loose, storage-stable particles comprised of vulcanized rubber pellets having adhered thereto vulcanized, fine rubber particles, and in some instances aggregates of the latter, each coated with rubberized-asphalt and an outermost adherent layer of mineral dust-powdered asphalt mix.

An example of the use of the foregoing composition is to spread in desired thickness on, for example, a prepared base of concrete, asphalt, or a stabilized gravel or macadam.

These bases should preferably be primed with the conventional rubber-asphalt primer such as a soft rubber-asphalt mixture of the type aforesaid, applied hot, or as a cold rubber-asphalt cutback. After the mixture has been spread to the proper thickness it can be compacted by rollers, tampers, or other suitable means of compression. In order to facilitate the compression, the surface can be spread with gasoline or naphtha, allowed to remain for ten minutes to one-half hour, depending upon the thickness of the surface and weather conditions, and the gasoline or naphtha allowed to evaporate. Immediately upon compression the surface can be opened to whatever traffic it will be subjected.

The thickness of the finished mixture can be from ¼" to 1" after compression, depending upon the results desired. For ordinary playgrounds, a thickness of rubberized pellet mixture formed in accordance with the present invention, compressed to not more than ¼" thickness is adequate, except under the more hazardous equipment, such as bars, slides, rings, etc., where greater thicknesses may be employed, the objective being to make sufficient thickness to prevent serious injury.

I claim:

1. A surfacing composition comprised of from about 40% to about 60% by weight of vulcanized rubber pellets intimately mixed with from about 15% to about 25% by weight of finely ground vulcanized rubber and all substantially uniformly coated with from about 20% to about 30% by weight of rubberized asphalt having a rubber latex solids content of from about 1% to about 5% by weight and a penetration of from about 50 to about 150 at 77° F., said composition being in the form of loose, friable, storage stable particles all passing a one-half inch mesh screen and coated with from about 2% to about 3% by weight of an adherent mixture of mineral dust and powdered asphalt wherein the latter is from about 25% to about 75% by weight of the mixture.

2. Storage stable, pressure compactable, normally friable, surfacing composition particles substantially all of which pass a one-fourth inch mesh screen, comprised of from about 40% to about 60% by weight of vulcanized fiber-free, angular rubber pellets substantially all of which pass a one-fourth inch mesh screen and are retained on a 10 mesh screen intimately mixed with from about 15% to about 25% by weight of finely ground vulcanized rubber substantially all of which passes an 80 mesh screen, and from about 20% to about 30% by weight of a rubberized asphalt having a rubber latex-solids content of from about 1% to about 5% by weight and a penetration of from about 50 to about 150 at 77° F., substantially uniformly distributed over and coating said rubber particle mixture, said particles carrying from about 2% to about 3% by weight of an adherent layer composed of a mixture of powdered asphalt and mineral dust wherein the latter is from about 25% to about 75% by weight of the mixture.

3. Storage stable, pressure compactable, normally friable particle material substantially all of which passes a one-fourth inch mesh screen comprised of from about 40% to about 60% by weight of vulcanized rubber pellets intimately mixed with from about 15% to about 25% by weight of finely ground vulcanized rubber and all substantially uniformly coated with from about 20% to about 30% by weight of rubberized asphalt having a rubber latex solids content of from about 1.5% to about 2.5% by weight and a penetration of from about 85 to about 100 at 77° F., said particle material being further coated with from about 2% to about 3% by weight thereof of an adherent mixture of about equal parts by weight of powdered asphalt and mineral dust.

4. The method of forming storage stable, pressure compactable, normally friable, surfacing composition particles, which comprises mixing a body of vulcanized, angular, fiber-free rubber pellets preheated to a temperature of from about 150° to about 250° F. with a relatively smaller proportion by weight of finely ground fiber-free, vulcanized rubber particles, and while continuing mixing adding thereto and coating said rubber particle mixture with a rubberized asphalt having a penetration of from about 50 to about 150 at 77° F., liquefied at a temperature of from about 300 to about 400° F., discharging the resulting composite and while permitting it to cool to a temperature of from about 150 to about 200° F. separating aggregates to particles substantially all of which pass a one-quarter inch mesh screen and coating them at said temperature with an adherent layer of mineral dust to prevent the resultant particles from sticking together in storage on cooling to normal atmospheric temperature and powdered asphalt to raise the softening point of the asphaltic coating on the rubber particles upon compaction.

5. The method of forming storage stable, pressure compactable, normally friable, surfacing composition particles, which comprises mixing from about 40% to about 60% by weight of vulcanized, angular, fiber-free rubber pellets, substantially all of which pass a one-fourth inch screen and are retained on a 10 mesh screen preheated to a temperature of from about 150° to about 250° F. with from about 15% to about 25% by weight of finely ground fiber-free, vulcanized rubber particles substantially all of which pass an 80 mesh screen, and while continuing mixing adding thereto and coating said rubber particle mixture with from about 20% to about 30% by weight of a rubberized asphalt having a rubber latex solids content of from about 1% to about 5% by weight, and a penetration of from about 50 to about 150 at 77° F., liquefied at a temperature of from about 300 to about 400° F., discharging the resulting composite and while permitting it to cool to a temperature of from about 150 to about 200° F. separating aggregates to particles substantially all of which pass a one-quarter inch mesh screen and coating them at said temperature with an adherent layer of dust containing inert mineral passing a 200 mesh screen to prevent the resultant particles from sticking together in storage on cooling to normal atmospheric temperature, and powdered asphalt to raise the softening point of the asphaltic coating upon compaction of the particles.

6. Storage-stable, normally friable, composite particles for providing resilient, substantially waterproof and weatherproof unitary surfacing composition by compaction, composed of a body of angular, vulcanized, fiber-free, rubber pellets substantially all of which pass a ¼-inch mesh and are retained on a 10 mesh screen, and a relatively smaller proportion by weight of finely ground fiber-free, vulcanized rubber particles disposed in normally void areas between said relatively larger angular particles, a substantially uniform coating of rubberized asphalt on said rubber particles of from about 20% to about 30% by weight thereof, including a rubber latex solids content of from about 1% to about 5% by weight and having a penetration of from about 50 to about 150 at 77° F., and from about 2% to about 3% by weight of a discrete particle layer of a mixture of mineral dust and powdered asphalt wherein the latter is from about 25% to about 75% by weight of the mixture passing a 20 mesh screen, the mineral dust serving to prevent the particles from sticking together in storage and the powdered asphalt to raise the softening point of the rubberized-asphalt coating on the rubber particles on compaction of said particles.

7. The method of forming a substantially waterproof and weatherproof unitary resilient surface composed principally of rubber, which comprises applying a fluidized rubberized-asphalt composition as a primer to a base to be surfaced, spreading thereover a layer of dust and powdered asphalt coated particle material substantially all of which passes a one-quarter inch mesh screen, comprised of from about 40% to about 60% by weight of vulcanized rubber pellets intimately mixed with from about 15% to about 25% by weight of finely ground vulcanized rubber and all substantially uniformly coated with from about 20% to about 30% by weight of rubberized asphalt having a rubber latex solids content of from about 1% to about 5% by weight and a penetration of from about 50 to about 150 at 77° F., and from about 2% to about 3% by weight of an outermost adherent layer composed of from about 25% to about 75% by weight of mineral dust and the balance powdered asphalt and then subjecting said layer of particle material to compression to compact the particles together and to said base as a unitary mass.

References Cited in the file of this patent

UNITED STATES PATENTS

| | | |
|---|---|---|
| 2,562,149 | Mollring | July 24, 1951 |
| 2,807,596 | Flickinger | Sept. 24, 1957 |
| 2,830,963 | Traxler et al. | Apr. 15, 1958 |
| 2,871,774 | Johnson | Feb. 3, 1959 |